United States Patent
Joung et al.

(10) Patent No.: US 8,470,487 B2
(45) Date of Patent: Jun. 25, 2013

(54) DIRECT METHANOL FUEL CELL SYSTEM

(75) Inventors: Young-soo Joung, Anseong-si (KR);
Young-seung Na, Yongin-si (KR);
Hye-jung Cho, Anyang-si (KR)

(73) Assignee: Samsung SDI Co., Ltd., Suwon-si, Gyeonggi-do (KR)

(*) Notice: Subject to any disclaimer, the term of this patent is extended or adjusted under 35 U.S.C. 154(b) by 760 days.

(21) Appl. No.: 12/639,231

(22) Filed: Dec. 16, 2009

(65) Prior Publication Data

US 2010/0167095 A1    Jul. 1, 2010

(30) Foreign Application Priority Data

Dec. 30, 2008  (KR) .................. 10-2008-0137167

(51) Int. Cl.
*H01M 8/04* (2006.01)
*H01M 8/06* (2006.01)

(52) U.S. Cl.
USPC ........................... 429/448; 429/414; 429/515

(58) Field of Classification Search
USPC ................. 429/408, 414, 428, 443, 447, 448, 429/452, 456, 513, 515
See application file for complete search history.

(56) References Cited

U.S. PATENT DOCUMENTS

| | | | |
|---|---|---|---|
| 2004/0121214 A1* | 6/2004 | Akasaka et al. | 429/34 |
| 2006/0177724 A1* | 8/2006 | Tajima et al. | 429/34 |

FOREIGN PATENT DOCUMENTS

| | | | |
|---|---|---|---|
| JP | 2004-127530 A | | 4/2004 |
| JP | 2008080198 A | * | 4/2008 |
| JP | 2008-262845 A | | 10/2008 |
| JP | 2008262845 A | * | 10/2008 |

OTHER PUBLICATIONS

Machine translation for Fukuda, JP 2008-262845 A.*
Japanese Office action dated Jun. 19, 2012 for JP 2009-296169.

* cited by examiner

*Primary Examiner* — Edu E Enin-Okut
(74) *Attorney, Agent, or Firm* — Lee & Morse, P.C.

(57) ABSTRACT

A direct methanol fuel cell (DMFC) system including: a separator receiving a gas-liquid mixture discharged from a stack and separating the mixture to gas and a liquid; a methanol cartridge storing high concentration methanol; and a fuel mixer for methanol dilution. The separator and the fuel mixer are separate structures, each including an agitator for stirring a liquid. The agitators can be on the same rotation axis.

4 Claims, 8 Drawing Sheets

DIRECT METHANOL FUEL CELL SYSTEM

CROSS-REFERENCE TO RELATED APPLICATION

This application claims the benefit of Korean Application No. 10-2008-0137167, filed Dec. 30, 2008 in the Korean Intellectual Property Office, the disclosure of which is incorporated herein by reference.

BACKGROUND OF THE INVENTION

1. Field of the Invention

One or more embodiments relate to a fuel cell system using methanol as a direct fuel (hereinafter, referred to as a direct methanol fuel cell (DMFC)).

2. Description of the Related Art

In general, fuel cells are devices that directly convert chemical energy included in a fuel into electric energy by chemical reactions and are a type of energy generating devices that continuously generating electricity if fuels are supplied thereto. A direct methanol fuel cell (DMFC), which is a type of fuel cell, uses methanol as the fuel and has methanol supplied to an anode of the DMFC so as to react with oxygen supplied to a cathode of the DMFC to generate electricity. At the anode, the reaction represented by Formula 1 takes place, wherein electrons are generated and moved to the cathode along an electrical circuit, thereby causing the reaction represented by Formula 2. If a device requiring electricity is placed as an electrical load in the electrical circuit, tasks requiring electricity can be performed.

$$CH_3OH+H_2O \leftrightarrow CO_2+6H^++6e- \quad \text{[Formula 1]}$$

$$3/2O_2+6H^++6e- \leftrightarrow 3H_2O \quad \text{[Formula 2]}$$

Using only one assembly including one anode and one cathode, in which the reactions represented by Formulae 1 and 2 take place, may not generate sufficient electricity, and thus a stacked-form assembly is used.

A DMFC system denotes an entire device for supplying methanol and oxygen to the stack, generating electricity using the methanol and oxygen supplied, and re-circulating and re-using water, which is a product of the reaction of Formula 2, un-reacted methanol, and by-product water. In the DMFC system, if loss of highly-volatile methanol due to evaporation is minimized and the range of fluctuations in the concentration of methanol in the stack is reduced, a stable DMFC system can be realized.

SUMMARY OF THE INVENTION

One or more embodiments include a fuel cell system using methanol as a direct fuel (hereinafter, referred to as a direct methanol fuel cell (DMFC)). To achieve the above and/or other aspects, one or more embodiments may include a direct methanol fuel cell (DMFC) system including: a stack generating electricity through a reaction using methanol and oxygen; a separator receiving a gas-liquid mixture discharged from the stack and separating the mixture into a gas and a liquid; a methanol cartridge storing high concentration methanol; and a fuel mixer having a separate space divided from the separator, mixing high concentration methanol supplied from the methanol cartridge with the liquid supplied from the separator in the separate space, and diluting the mixture to low concentration methanol to be applied to the stack.

The system may further include agitators for stirring a liquid respectively in the separator and the fuel mixer. The agitators in the separator and the agitator in the fuel mixer may be operated by one operating source.

The separator and the fuel mixer may be encased in one housing but respectively disposed in regions that are separate from each other. In that case, the respective agitators may be installed on a single rotation axis of the operating source, the rotation axis therefore penetrating the regions that are separated from each other.

At least one of the agitators in the fuel mixer and the separator may include a wire wing, in which one end thereof is fixed to the rotation axis. The wire wing may be further wrapped with a spring.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
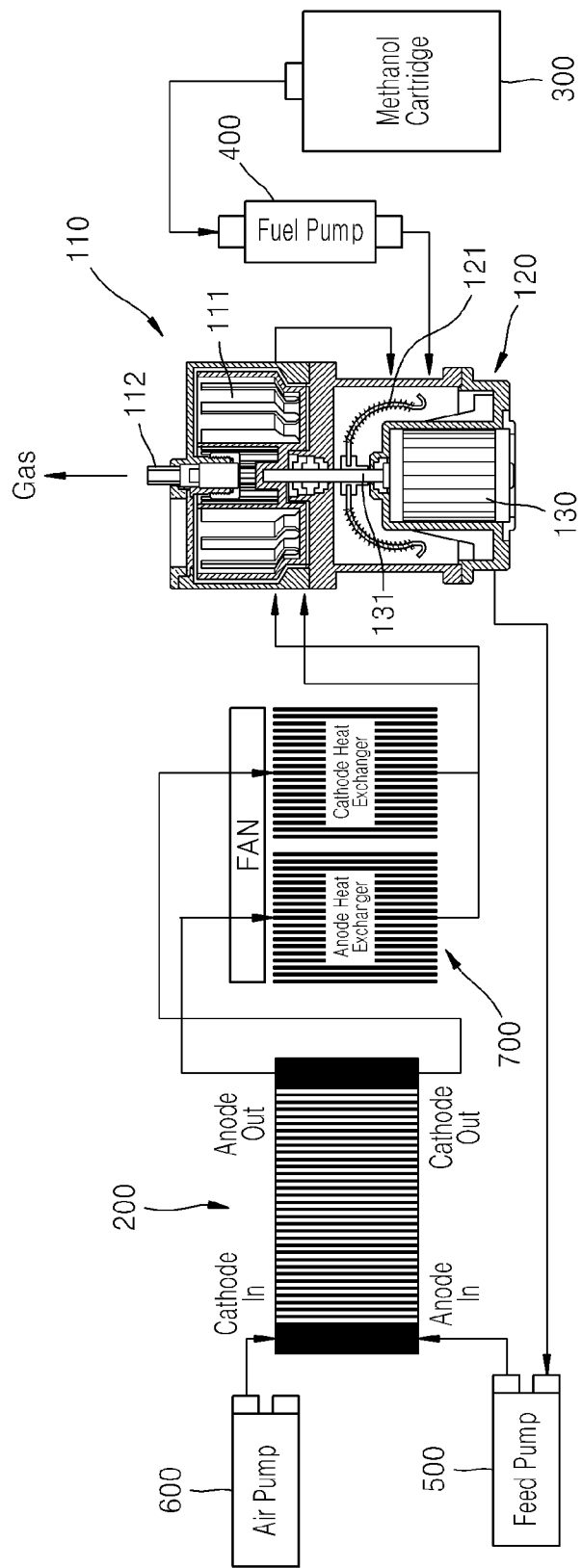
FIG. 1 is a diagram illustrating a direct methanol fuel cell (DMFC) system according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
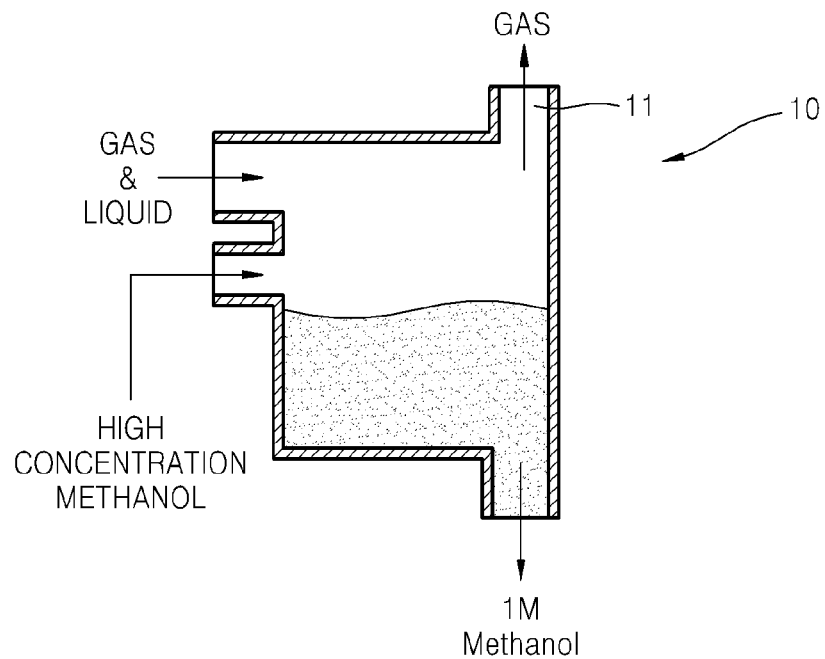
FIGS. 2A through 2C illustrate embodiments of DMFC systems according to comparative examples 1, 2 and 3, respectively.
Figure 2B:
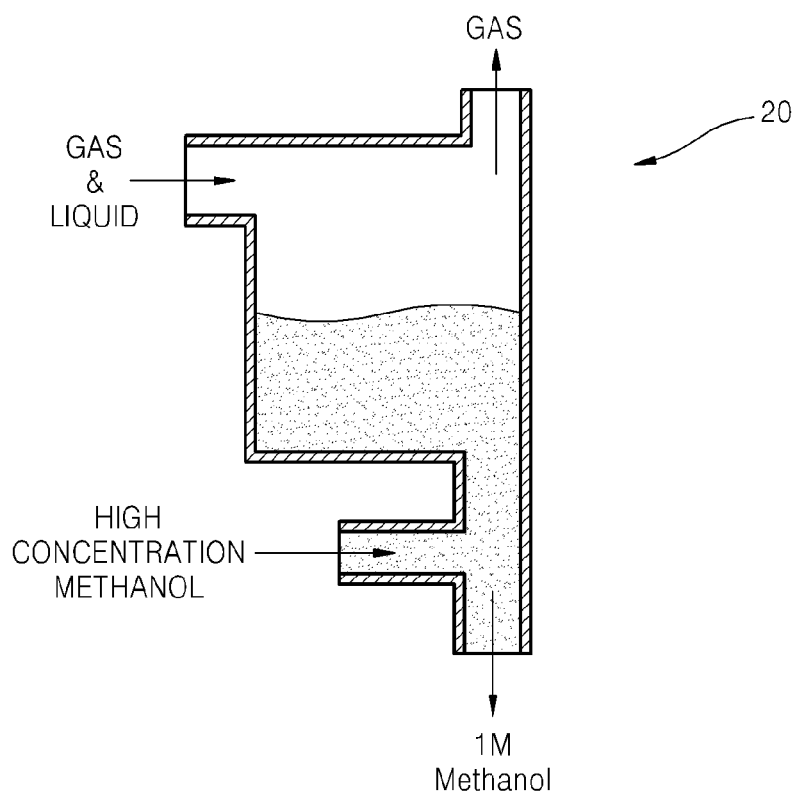
Figure 2C:
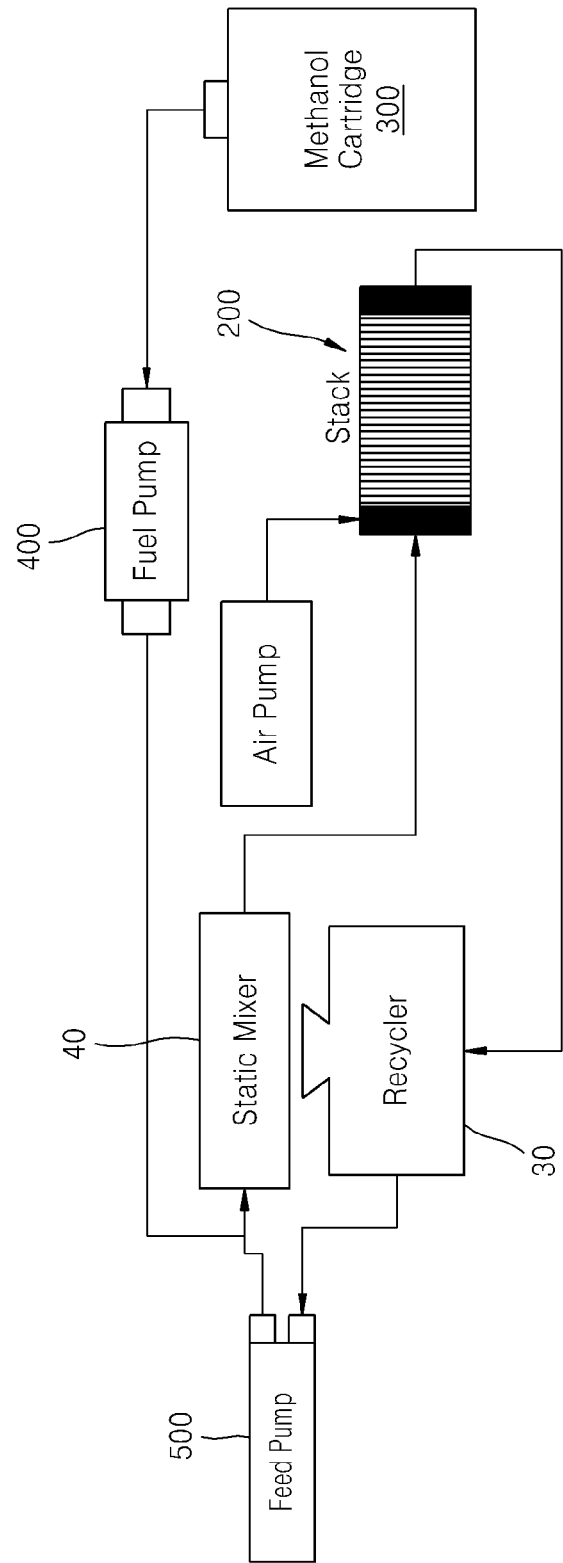

FIG. 1 is a diagram illustrating a direct methanol fuel cell (DMFC) system including a fuel mixer and a separator according to an embodiment and FIGS. 2A through 2C illustrate embodiments of DMFC systems according to comparative examples 1, 2, and 3, respectively. Referring to FIG. 1, the DMFC system according to the present embodiment includes a stack 200, a methanol cartridge 300, a separator 110, and a fuel mixer 120. In the stack 200, an electricity generating reaction takes place using oxygen supplied to cathodes of the stack 200 by an air pump 600 and methanol supplied to anodes of the stack 200 by a feed pump 500. In the methanol cartridge 300, a high concentration of close to 100% methanol is stored to be used as the anode fuel in the stack 200. In the separator 110, un-reacted methanol, un-reacted oxygen, as well as water that is a product of the electricity generating reaction, is received from the stack 200 and separated into a gas and a liquid. In the fuel mixer 120, high concentration methanol supplied from the methanol cartridge 300 is mixed with a liquid, such as the water and methanol separated in the separator 110, and the high concentration methanol is diluted to about 1 M methanol to be applied to the stack 200.

Accordingly, as the system is operated, the 1 M methanol mixture is applied to the anode of the stack 200 by the feed pump 500 and oxygen is supplied to the cathode of the stack 200 by the air pump 600 so that an electricity generating reaction takes places. Here, water generated as a product of the electricity generating reaction, un-reacted methanol, and un-reacted oxygen are discharged to the separator 110 and are separated into a gas and a liquid. Then, the separated liquid, that is, the un-reacted methanol and water are sent to the fuel mixer 120 and are mixed with high concentration methanol supplied from the methanol cartridge 300. Reference numeral 700 denotes a heat exchanger cooling water, un-reacted methanol, and un-reacted oxygen discharged from the anode and the cathode of the stack 200.

If in a comparative example, 1 M methanol, which is the concentration of methanol to be supplied to the stack 200, is stored in the methanol cartridge 300 to operate the system, the volume of the methanol cartridge 300 would be required to be very large and the methanol cartridge 300 would need to be replaced frequently. Therefore, a high concentration of close to 100% methanol may be diluted in the fuel mixer 120 to about 1 M and then the diluted methanol is supplied to the stack 200. However, since methanol is highly volatile, some methanol may be discharged as gas during a fuel mixing process such that the fuel use efficiency of the DMFC system may be decreased. Also, every time high concentration methanol is input to the fuel mixer 120, the concentration of the methanol supplied to the stack 200 may rapidly increase, thereby lowering performance. In the present embodiment, the DMFC system is configured to solve the above and/or other problems.

The fuel mixer 120, to which high concentration methanol is supplied, has a separate space divided from the separator 110, to which gas separated from a liquid is discharged, so that methanol loss due to evaporation may be prevented. For reference, comparing the configurations of the comparative examples 1 and 2 illustrated in FIGS. 2A and 2B with the configuration of the present embodiment, the functions of the separator 110 and the fuel mixer 120, which are respectively to separate a gas and a liquid and to dilute high concentration methanol, are combined in recyclers 10 and 20. Accordingly, high concentration methanol supplied from the methanol cartridge 300 and a gas-liquid mixture discharged from the stack 200 is input together in the recyclers 10 and 20. Gases separated in the recyclers 10 and 20 are discharged from the recyclers 10 and 20 and the liquid is circulated and supplied again to the stack 200.

More specifically, in the comparative example 1 of FIG. 2A, the recycler 10 is configured for high concentration methanol to be input to a region occupied by gas. In the comparative example 2 of FIG. 2B, the recycler 20 is configured for high concentration methanol to be input to a region occupied by liquid. However, both comparative examples 1 and 2 have problems in stably operating the system. In the comparative example 1 of FIG. 2A, due to the high volatility of methanol, some methanol may be evaporated through a gas outlet 11, and thus fuel loss may increase. In the comparative example 2 of FIG. 2B, since methanol is input to the region occupied by liquid, methanol evaporation may be reduced. However, as high concentration methanol is directly input to the stack 200 before being uniformly mixed, the concentration of methanol sent to the stack 200 may fluctuate widely, and thus the system may be unstable.

The configuration illustrated in the comparative example 3 of FIG. 2C is not generally used but is illustrated here to identify the effect of an agitator 121 included in the fuel mixer 120 of the present embodiment. Thus, in comparative example 3, a fuel mixer 40, which is separate from a recycler 30, does not include an agitator. It is expected that the concentration of methanol supplied to the stack 200 in comparative example 3 fluctuates widely.

With regard to the DMFC system of FIG. 1, the DMFC system of FIG. 1 is configured to solve all problems described above. In the DMFC system of FIG. 1, the separator 110, which separates a gas-liquid mixture discharged from the stack 200 and discharges gas, is completely separate from the fuel mixer 120, to which high concentration methanol is input. Thus, high concentration methanol input to the fuel mixer 120 is prevented from being lost through the gas outlet 112.

In addition, agitators 111 and 121 for stirring liquid are installed in the separator 110 and the fuel mixer 120, respectively. The agitator 111 allows for the separation of gas and liquid to be easily performed in the separator 110 using centrifugal force. Due to the agitator 121, although high concentration methanol is input to the fuel mixer 120, methanol may be immediately and uniformly mixed in the fuel mixer 120 so that the concentration of methanol supplied to the stack 200 may be prevented from fluctuating widely. Moreover, the agitators 111 and 121, respectively in the separator 110 and the fuel mixer 120, are installed along a rotation axis 131 of a single operating motor 130, and thus are easily configured. That is, since a rotor, which is the agitator 111 of the separator 110, and at least one wire wing, which is the agitator 121 of the fuel mixer 120, are connected to the rotation axis 131 of the operating motor 130, which penetrates the separator 110 and the fuel mixer 120, the operating motor 130 may simultaneously operate the agitators 111 and 121.

Figure 3A:
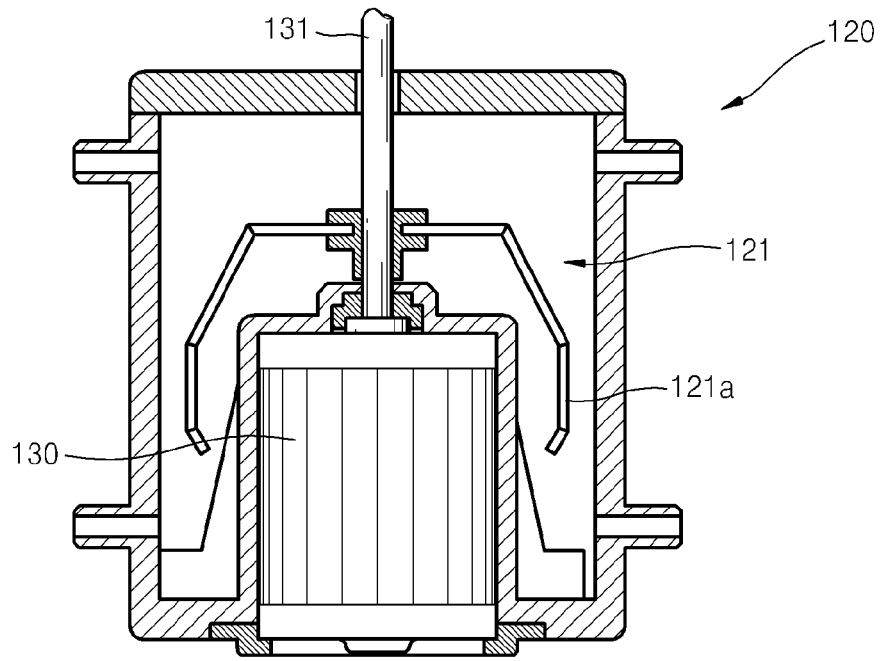
FIGS. 3A and 3B are cross-sectional views of a fuel mixer included in the DMFC system of FIG. 1, each illustrating a type of agitator.
Figure 3B:
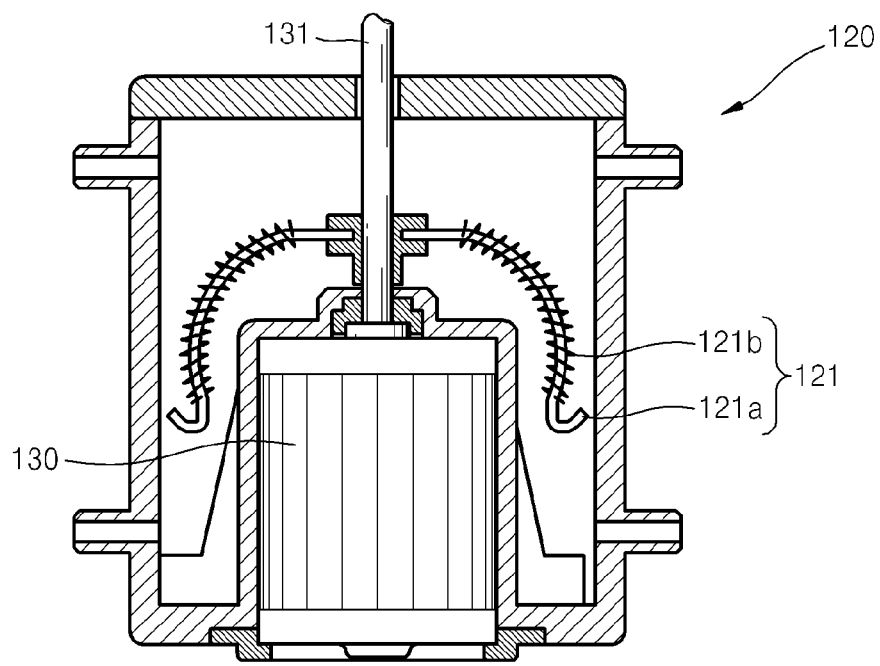

FIGS. 3A and 3B are cross-sectional views of the fuel mixer 120 of the DMFC system of FIG. 1, each illustrating a type of agitator. The agitator 121 in the fuel mixer 120 may include at least one wire wing 121a, made of stainless steel, as illustrated in FIG. 3A, or at least one of the wire wings 121a coiled with a spring 121b, made of stainless steel, as illustrated in FIG. 3B. In the fuel mixer 120 of FIG. 3B, the spring 121b may increase the vorticity and thus liquid may be more uniformly mixed.

Figure 4:
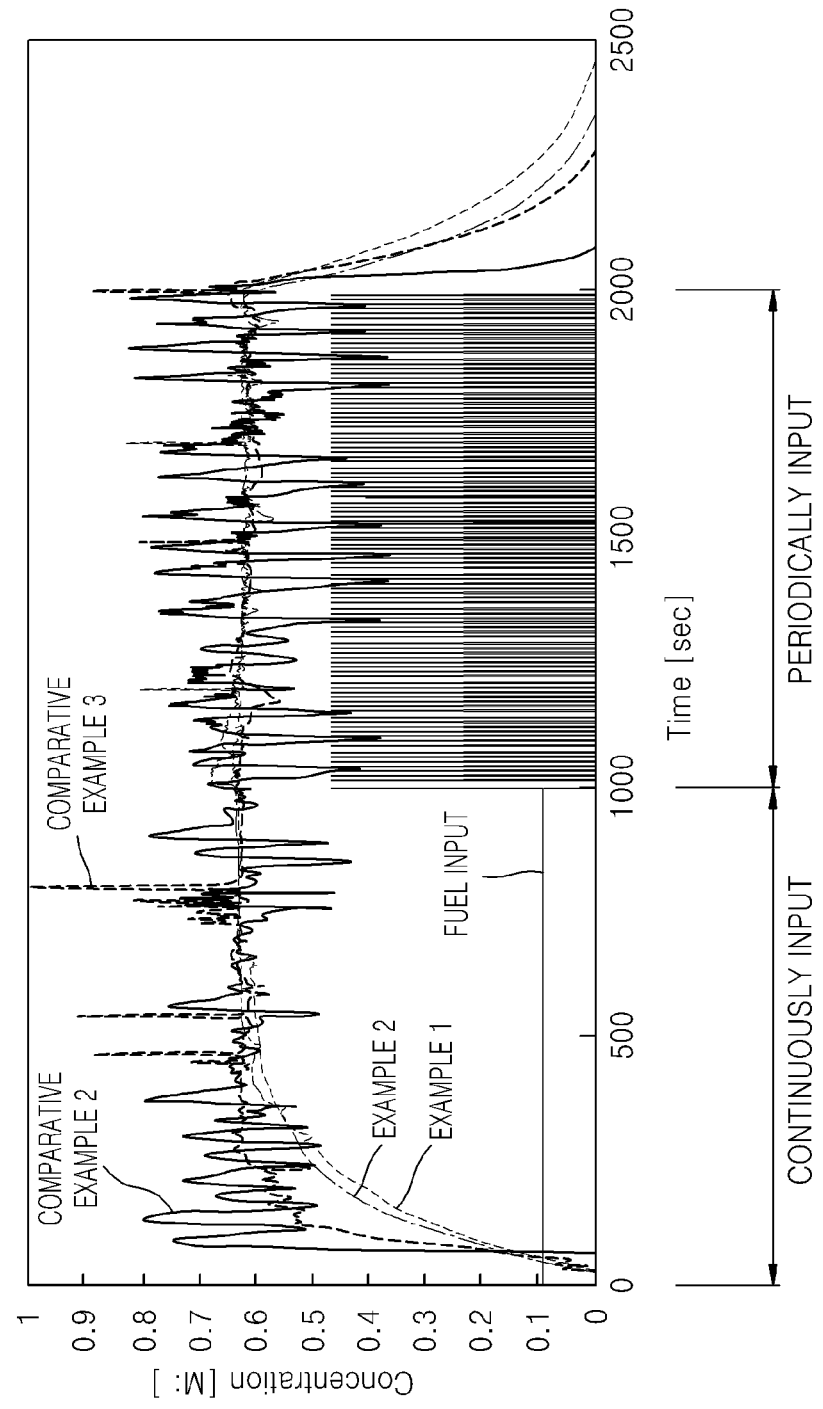
FIGS. 4 through 5B are graphs showing results obtained by measuring changes in methanol concentration supplied to a stack in the DMFC system of FIG. 1 and DMFC systems according to the comparative examples.

In order to compare methanol concentration stability in the DMFC system of the present embodiment with the stabilities of the comparative examples, the changes in the concentration of methanol input to the stack 200 during operating of the system were measured. A concentration sensor (not illustrated) prepared near an outlet of the fuel mixer 120 was used to measure concentrations. Also, a case in which a predetermined amount of methanol was continuously input to the system by continuously operating a fuel pump 400 and a case in which fuel was repeatedly input and blocked periodically by intermittently operating the fuel pump 400 were conducted sequentially. The feed pump 500 was continuously operated at about a speed of 20 cc/min, as it would be in operating an actual system. Comparative examples 2 and 3, which have a lower risk of methanol evaporation, were selected, and FIG. 3A, which includes wire wings 121a (Example 1), and FIG. 3B, which includes the wire wings 121a having the springs 121b coiled around the wire wings 121a (Example 2) in the present embodiments, were selected for an experiment. Accordingly, the result as measured as in FIG. 4 could be obtained. The fuel pump 400 was continuously operated from 0 to 1,000 seconds and periodically operated from 1,000 to 2,000 seconds. Methanol concentrations in the comparative examples 2 and 3 changed widely. However, in the examples 1 and 2, changes in concentration were stable both in cases where fuel was continuously input and periodically input. It can be seen that since the agitator 121 installed in the fuel mixer 120 rapidly and uniformly diluted the fuel, wide changes in concentration as in the comparative examples did not occur in the examples 1 and 2.

Figure 5A:
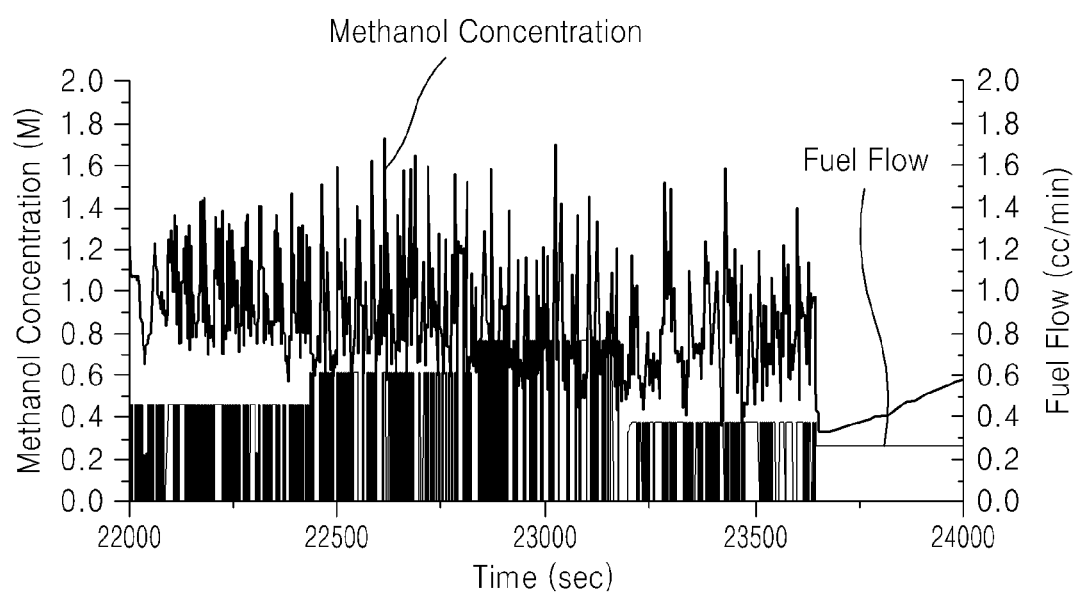
Figure 5B:
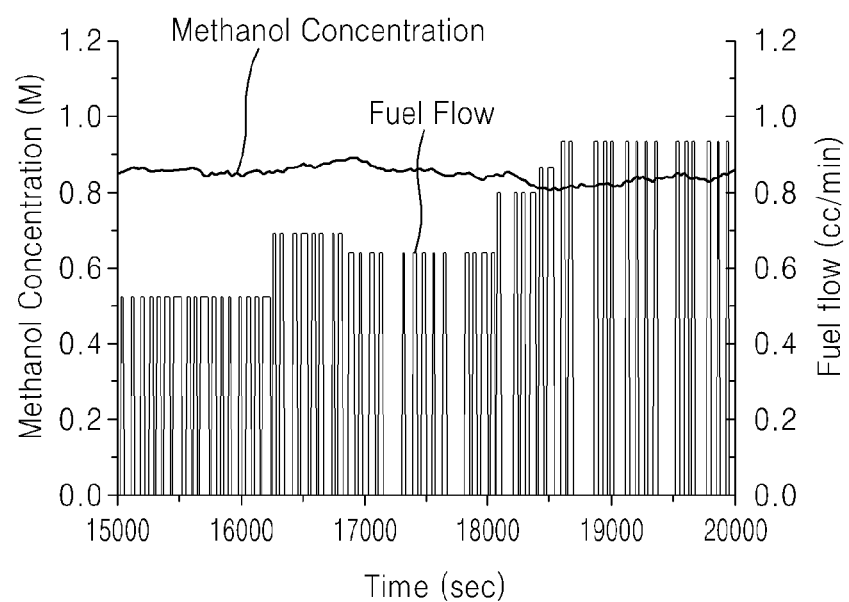

FIGS. 5A and 5B are graphs showing results obtained by measuring concentration change in comparative example 2 and example 1 respectively by inputting fuel over multiple periods. As expected, concentration fluctuated widely as fuel was input in comparative example 2 illustrated in FIG. 5A, whereas the concentration was stable regardless of periods and changes in input amount in example 1 illustrated in FIG. 5B. Thus, the DMFC system may be stably operated.

Figure 6:
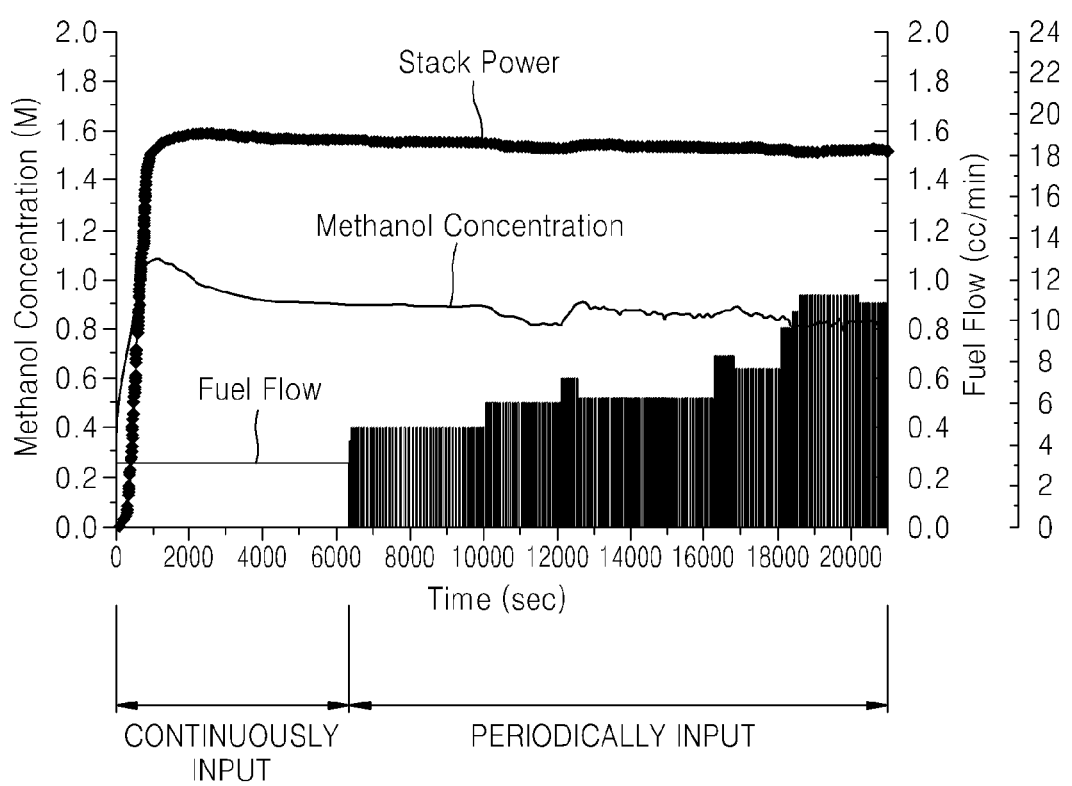
FIG. 6 is a graph showing results obtained by measuring changes in methanol concentration in the DMFC system of FIG. 1 and changes in output power of a stack.

FIG. 6 is a graph showing the result obtained by measuring changes in the concentration of methanol as a function of the input amount of fuel in example 1 and changes in output power of the stack 200. Since the concentration of methanol supplied to the stack 200 was stable, the output power of the stack 200 was also stable. Therefore, the concentration of methanol supplied to the stack 200 can be uniformly maintained so that output instability as a result of wide changes in concentration of methanol can be prevented and the DMFC system can be stably operated.

The embodiments described herein are for a direct methanol fuel cell. Similar embodiments are applicable to any process where products of a reaction are separated or purified in one part of the process and additional input reagents are stored in concentrated form and then diluted before being mixed with the separated or purified stream for further processing.

Although a few embodiments of the present invention have been shown and described, it would be appreciated by those skilled in the art that additional changes may be made in these embodiments without departing from the principles and spirit of the invention, the scope of which is defined in the claims and their equivalents.

What is claimed is:

1. A direct methanol fuel cell (DMFC) system comprising:
   a stack generating electricity through a reaction using methanol and oxygen;
   a separator receiving a gas-liquid mixture discharged from the stack and separating the mixture into a gas and a liquid;
   a methanol cartridge storing high concentration methanol;
   a fuel mixer encased in a same housing as the separator and having a separate region divided from the separator, the fuel mixer mixing the high concentration methanol supplied from the methanol cartridge with the liquid supplied from the separator in the separate region, and providing low concentration methanol to be applied to the stack; and
   a first agitator in the separator and a second agitator in the fuel mixer, the first agitator and the second agitator being operated by a single operating source, the first agitator and the second agitator being installed on a rotation axis of the operating source.

2. The system of claim 1, wherein the rotation axis penetrates the separate separator and fuel mixer regions of the housing.

3. The system of claim 2, wherein at least one of the agitators in the fuel mixer and the separator comprises at least one wire wing, in which one end thereof is fixed to the rotation axis.

4. The system of claim 3, wherein the at least one wire wing is further wrapped with a spring.

\* \* \* \* \*